United States Patent
MacQueen

(10) Patent No.: US 9,725,911 B2
(45) Date of Patent: Aug. 8, 2017

(54) RESILIENT ARTICLES AND METHODS OF MANUFACTURING THEREOF

(71) Applicant: Congoleum Corporation, Mercerville, NJ (US)

(72) Inventor: Richard C. MacQueen, Phillipsburg, NJ (US)

(73) Assignee: CONGOLEUM CORPORATION, Mercerville, NJ (US)

( * ) Notice: Subject to any disclaimer, the term of this patent is extended or adjusted under 35 U.S.C. 154(b) by 71 days.

(21) Appl. No.: 14/828,618

(22) Filed: Aug. 18, 2015

(65) Prior Publication Data

US 2016/0047130 A1    Feb. 18, 2016

Related U.S. Application Data

(60) Provisional application No. 62/038,756, filed on Aug. 18, 2014.

(51) Int. Cl.

| | |
|---|---|
| B32B 3/00 | (2006.01) |
| E04F 15/10 | (2006.01) |
| B29C 47/00 | (2006.01) |
| C08J 7/04 | (2006.01) |
| B32B 37/00 | (2006.01) |
| B44C 1/24 | (2006.01) |
| B44C 5/04 | (2006.01) |
| B29K 23/00 | (2006.01) |
| B29L 9/00 | (2006.01) |
| B29L 31/10 | (2006.01) |
| B29L 7/00 | (2006.01) |

(Continued)

(52) U.S. Cl.
CPC .......... *E04F 15/10* (2013.01); *B29C 47/0021* (2013.01); *B32B 37/156* (2013.01); *B44C 1/24* (2013.01); *B44C 5/04* (2013.01); *C08J 7/042* (2013.01); *C08J 7/047* (2013.01); *B29K 2023/083* (2013.01); *B29K 2995/0087* (2013.01); *B29K 2995/0089* (2013.01); *B29L 2007/002* (2013.01); *B29L 2009/006* (2013.01); *B29L 2031/104* (2013.01); *B32B 38/06* (2013.01); *B32B 38/145* (2013.01); *B32B 2037/243* (2013.01); *B32B 2309/02* (2013.01); *B32B 2309/105* (2013.01); *B32B 2419/04* (2013.01); *C08J 2323/08* (2013.01); *C08J 2475/04* (2013.01)

(58) Field of Classification Search
CPC .... E04F 15/10; B29C 47/0021; B32B 38/145; B32B 2037/243; B32B 2419/04
See application file for complete search history.

(56) References Cited

U.S. PATENT DOCUMENTS

| | | | |
|---|---|---|---|
| 5,244,942 | A | 9/1993 | Hover et al. |
| 5,276,082 | A | 1/1994 | Forry et al. |

(Continued)

FOREIGN PATENT DOCUMENTS

| | | |
|---|---|---|
| EP | 0742098 A1 | 11/1996 |
| EP | 2009056 A1 | 12/2008 |

(Continued)

*Primary Examiner* — Elizabeth Mulvaney
(74) *Attorney, Agent, or Firm* — Choate, Hall & Stewart, LLP

(57) ABSTRACT

The present disclosure provides, among other things, articles with a design material directly applied to a base material to form products with desirable properties.

35 Claims, 6 Drawing Sheets

(51) Int. Cl.
*B32B 38/00* (2006.01)
*B32B 38/06* (2006.01)
*B32B 37/24* (2006.01)

(56) References Cited

U.S. PATENT DOCUMENTS

| | | |
|---|---|---|
| 5,391,612 A | 2/1995 | Johnson |
| 5,728,476 A | 3/1998 | Harwood et al. |
| 5,928,754 A | 7/1999 | Kondo et al. |
| 6,133,367 A | 10/2000 | Arhart |
| 6,201,032 B1 | 3/2001 | Shyu et al. |
| 6,287,706 B1 | 9/2001 | Simpson et al. |
| 6,346,207 B1 | 2/2002 | Liu |
| 6,380,296 B1 | 4/2002 | Inada |
| 6,730,388 B2 | 5/2004 | MacQueen et al. |
| 7,494,713 B2 | 2/2009 | Song et al. |
| 7,550,192 B2 | 6/2009 | Dempsey et al. |
| 7,939,137 B2 | 5/2011 | Becker-Weimann et al. |
| 8,039,555 B2 | 10/2011 | Sasaki et al. |
| 8,859,085 B2 | 10/2014 | Hahn et al. |
| 9,194,133 B2 | 11/2015 | Thiers |
| 9,453,348 B1 | 9/2016 | Meersseman et al. |
| 9,506,256 B2 | 11/2016 | Thiers |
| 2008/0020179 A1 | 1/2008 | Graab et al. |
| 2010/0297394 A1 | 11/2010 | Peace |
| 2011/0223387 A1 | 9/2011 | Fung et al. |
| 2012/0021148 A1 | 1/2012 | Thrush |
| 2013/0333821 A1 | 12/2013 | Hahn et al. |
| 2014/0037917 A1 | 2/2014 | Branch et al. |
| 2014/0069337 A1 | 3/2014 | Dunford |
| 2015/0210055 A1* | 7/2015 | Pervan .......... B32B 38/145 156/277 |

FOREIGN PATENT DOCUMENTS

| | | |
|---|---|---|
| WO | WO-2011/094005 A1 | 8/2011 |
| WO | WO-2014/166961 A1 | 10/2014 |

\* cited by examiner (a)          (b)          (c)

RESILIENT ARTICLES AND METHODS OF MANUFACTURING THEREOF

RELATED APPLICATIONS

This non-provisional patent application claims the benefit of priority under 35 U.S.C. 119(e) of U.S. provisional patent application No. 62/038,754, filed Aug. 18, 2014, entitled "RESILIENT ARTICLES AND METHODS OF MANUFACTURING THEREOF", the contents of which is hereby incorporated by reference in its entirety herein.

BACKGROUND

Tile materials are designed to offer a multitude of benefits for a variety of surface coverings. In recent years, tiles that simulate natural materials have been designed and engineered to be more resilient to exposure and wear. Such resilient tiles are typically made from multiple stacked layers. Individual layers are laminated together to produce a final tile product. To provide enhanced aesthetics, photorealistic images can be printed on a design layer to imitate, for example stone or marble. Engineered resilient flooring materials can provide long term products with a wide variety of visual design and style possibilities.

SUMMARY

The present disclosure provides an insight that some compositions are particularly useful in the manufacture of wear resistant surface coverings and/or articles and may be employed together to produce articles with surprising and beneficial attributes.

The present disclosure provides articles. In some embodiments, articles are characterized by a surface that is or can be resistant to abrasion. In some embodiments, provided articles are characterized in that they are or can be resistance to color fading. In some embodiments, provided articles are successfully employed as wear resistant surfaces, such as flooring tiles.

Implementations of articles of the present disclosure are useful for a wide range of surface covering applications, including but not limited to: flooring, walls, countertops, articles of furniture etc. in commercial, industrial, and residential applications. The present disclosure also provides methods of preparing and/or installing such coverings.

In some embodiments, provided articles are useful as surface coverings that characterized in that they are resistant to abrasion, scuffing, scratching, mars, and/or wear, for example, even after prolonged normal use. In some embodiments, articles are characterized by a Taber abrasion value of at least 2000 cycles to wear through a protective material having a thickness of at least 2 mils.

In some embodiments, provided articles are characterized in that they are light stable in that they resist color fading over time. In some embodiments, provided articles or materials are characterized by a Delta E of less than 5 following Xenon arc exposure for at least 400 hours.

In some embodiments, articles provided herein have a thickness in a range from: about 0.5 mm to 20 mm, about 1 mm to 15 mm, about 2 mm to 10 mm, or about 3 mm to 5 mm. In some embodiments, articles provided herein have a thickness of about 4 mm.

In some embodiments, articles are engineered and/or fabricated from compositions. In some embodiments, provided compositions are or comprise materials that may be stacked on one another.

In some embodiments, provided materials are or comprise multiple individual layers of material.

In some embodiments, compositions comprise a base material; a design material; and/or a protective material.

In some embodiments, compositions comprise a base material and a design material. Those skilled in the art will appreciate that, in some embodiments, a protective material may be separately applied to a design material on a base material.

In some embodiments, a base material provides structural-stability and/or solidity to a composition. In some embodiments, a base material provides an aesthetic background for a design material to be applied thereto. In some embodiments, a base material comprises 90% of a composition's thickness.

In some embodiments, a base material is or comprises a polymer. In some embodiments, a base material is or comprises a polymer mixture.

In some embodiments, a polymer and/or a polymer mixture for use in accordance with the present invention (e.g., in a base material) is characterized by a melt flow index as measured by ASTM D1238 in a range including: about 20 g/10 min to about 60 g/10 min. In some embodiments, a polymer and/or polymer mixture for use in accordance with the present invention (e.g., in a base material) is characterized as having a melt flow index of in a range of 35-45 g/10 min. measured by ASTM D1238.

In some embodiments, a polymer and/or polymer mixture as described herein is elastomeric. In some embodiments, a polymer and/or polymer mixture as described herein is thermoplastic.

In some embodiments, a polymer and/or polymer mixture as described herein is or comprises a thermoplastic polyurethane. In some embodiments, a polymer and/or polymer mixture as described herein is or comprises a thermoplastic polyolefin. In some embodiments, a thermoplastic polyurethane is or comprises a polyethylene, polypropylene, polymethylpentene, polybutene, or combinations thereof.

In some embodiments, a polymer and/or polymer mixture as described herein is or comprises a copolymer.

In some embodiments, a copolymer is a polyolefin copolymer. In some embodiments, a copolymer is a terpolymer.

In some embodiments, a preferred copolymer is ethylene-vinyl acetate (hereafter "EVA").

In some embodiments, a polymer and/or polymer mixture comprises about 5% to about 30% by weight of a base material.

In some embodiments, a base material further includes a binder. In some embodiments, a binder includes: a polymer, a tackifier, rheology modifiers, and/or plasticizers. In some embodiments, a binder includes additives. In some embodiments, a binder includes flow agents. In some embodiments, a binder includes stabilizers.

In some embodiments, a base material includes one or more pigments. In some embodiments, pigments provide desired shading for a base material. In some embodiments, pigments include titanium dioxide.

In some embodiments, a base material includes one or more fillers. In some embodiments, fillers are or include calcium carbonate, limestone, dolomite, amorphous silica, recycled materials (e.g., dry wall dust), or combinations thereof.

In some embodiments, a base material includes an aesthetic background layer. In some embodiments, an aesthetic background layer is white or colored and provides a background (i.e. a uniform canvas) to which a design material is applied. In some embodiments, an aesthetic background layer is or comprises a moisture cured polyurethane hot melt coating (e.g. HotCoating®).

In some embodiments, a base material includes a UV cured or curable primer. In some embodiments, a base material includes a clear UV cured or curable primer. In some embodiments, an aesthetic background layer includes a UV cured or curable primer.

In some embodiments, a base material is or comprises multiple layers of a base material stacked on one another.

In some embodiments, provided compositions comprise a base material and at least one design material on a base material.

In some embodiments, a design material provides a photo-realistic image of a desired aesthetic.

In some embodiments, a design material comprises an ink. In some embodiments, inks as described herein are or include UV cured or curable inks. In some embodiments, inks as described herein are or include water-based inks. In some embodiments, inks as described herein are or include latex-based inks. In some embodiments, inks as described herein are or include solvent-based inks. In some embodiments, a design material comprises at least one pigment. In some embodiments, a design material comprises at least one dye.

In some embodiments, a design material is or comprises multiple layers, for example, ink, pigment, dye, or combinations thereof.

In some embodiments, articles as described herein comprise a base material, a design material, and a protective material. In some embodiments, a protective material is or comprises a moisture cured polyurethane hot melt coating and/or clear material. In some embodiments, a clear material is a UV cured or curable primer. In some embodiments, a protective material is disposed of atop a design material.

In some embodiments, a protective material is configured to protect an article. In some embodiments, a moisture cured polyurethane hot melt coating and/or clear material is resistant to mechanical damage, such as rips or tears.

In some embodiments, a moisture cured polyurethane hot melt coating and/or a clear material is designed to have good adhesion to a base material and/or good adhesion to a design material.

In some embodiments, a moisture cured polyurethane hot melt coating and/or a clear material is or comprises multiple layers stacked on one another.

In some embodiments, a composition as described herein comprises, in order: a base material, a design material, and a protective material which comprises a top coat material.

In some embodiments, a top coat material is resistant to scratches, scuffs, mars, and/or abrasion. In some embodiments, a top coat material is referred to as a "no wax finish" material.

In some embodiments, a top coat material is configured to provide resistance to water. In some embodiments, a top coat material is insoluble in water.

In some embodiments, a top coat material is configured to provide a glossy aesthetic. In some embodiments, a glossy aesthetic is configured to have a flat appearance. In some embodiments, a glossy aesthetic is configured to have a high gloss appearance. In some embodiments, a glossy aesthetic is configured to have a semi-gloss appearance. In some embodiments, a top coat material is designed to have a gloss range between 5-95%.

In some embodiments, a top coat material is or comprises aluminum oxide.

In some embodiments, a top coat material is or comprises multiple layers of a top coat material stacked on one another.

In some embodiments, the present disclosure includes methods of manufacturing materials, compositions, and/or articles as described herein.

In some embodiments, provided methods of manufacturing include forming a base material, wherein a forming step comprises steps of melting and/or blending a polymer and/or polymer mixture as described herein at elevated temperature; and calendaring the melted polymer and/or polymer mixture into a web.

In some embodiments, methods of manufacturing include a step of punching a tile having a desired shape out of a web.

In some embodiments, provided methods comprise applying a moisture cured polyurethane hot melt coating to a base material. In some embodiments, provided methods of applying a moisture cured polyurethane hot melt coating comprise heated roll coating. In some embodiments, provided methods further comprise applying a UV curable primer.

In some embodiments, provided methods of manufacturing comprise curing a moisture cured polyurethane hot melt coating and/or a UV curable primer. In some embodiments, the curing step is an active cure. In some embodiments, the curing step is a passive cure.

In some embodiments, methods of manufacturing provided herein include applying (e.g., printing) a design material atop a base material. In some embodiments, applying may be by directly applying (e.g. direct printing). In some embodiments, ink jet printing is a preferred technology for applying and/or directly applying.

In some embodiments, methods of manufacturing comprise a step of punching a tile having a desired shape out of a composition having a design material applied to a base material.

In some embodiments, provided methods of manufacturing include applying a moisture cured polyurethane hot melt coating and/or a clear material to a design material. In some embodiments, a step of applying comprises for example roll coating. In some embodiments, a step of roll coating utilizes a roll coater.

In some embodiments, provided methods of manufacturing comprise curing a moisture cured polyurethane hot melt coating and/or clear material. In some embodiments, a curing step is an active cure. In some embodiments, a curing step is a passive cure.

In some embodiments, provided methods of manufacturing include applying a top coat material to a moisture cured polyurethane hot melt coating (e.g., that is on a design material or on a base material). In some embodiments, a top coat material is a liquid. In some embodiments the step of applying a top coat material comprises roll coating. In some embodiments, the step roll coating utilizes a roll coater.

In some embodiments, provided method of manufacturing include curing and/or laminating provide compositions and/or articles engineered from provided compositions.

In some embodiments, provided methods of manufacturing include curing a top coat material. In some embodiments, the curing step is an active cure. In some embodiments, the curing step is a passive cure. In some embodiments, methods of manufacturing includes embossing a cured top coat material.

In some embodiments, provided methods of manufacturing include edging, i.e. rounding, beveling, or depressing after a step of curing. In some embodiments, provided methods of manufacturing include embossing or edging an article having a moisture cured polyurethane hot melt coating. In some embodiments, provided methods of manufacturing include embossing or edging during a step of curing a moisture cured polyurethane hot melt coating.

BRIEF DESCRIPTION OF THE DRAWING

FIG. 2 at the far left hand panel, labeled (a) shows color fading for a resilient printed tile as disclosed herein. FIG. 2 at the center panel, labeled (b) shows color fading for a printed tile having a PVC base. FIG. 2 at the far right hand panel, labeled (c) shows color fading for a design film adhered to a PVC base.

DETAILED DESCRIPTION OF CERTAIN EMBODIMENTS

Figure 1:
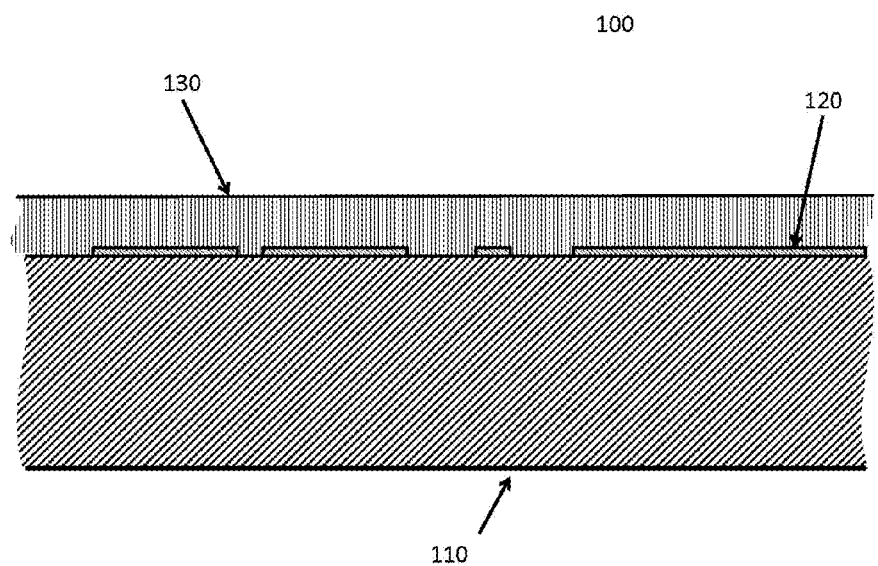
FIG. 1 shows a cross section of a resilient printed tile according to one embodiment of the present disclosure.

Various embodiments according to the present disclosure are described in detail herein. In particular, the present disclosure describes articles and methods of manufacturing such articles. Provided articles are particularly useful as tiles, for example, for use as a floor covering.

The present disclosure encompasses a recognition that surface coverings are typically subjected to high traffic resulting in exposure to conditions wherein there is a high incidence of abrasion, scratches, mars, scuffs, and wear. In some embodiments, articles in accordance with the present disclosure demonstrate superior abrasion resistance.

The present disclosure also encompasses a recognition that over time exposure to the elements and specifically light exposure can affect surface covering materials. In some embodiments, articles described herein are particularly resistance to color fading without an addition of light stabilizing compounds or UV stabilizers.

Surface coverings are typically configured as sheets of material. Sheets may be designed to adopt a variety of sizes, shapes, and thicknesses. As such, sheets are adaptable and may be readily tailored to meet an end use. Sheets are traditionally manufactured through an assembly of individual layers. In general, those skilled in the art, such as manufacturers of surface coverings and in particular floor tiles view such articles as materials or layers of materials that are assembled from the bottom up.

The present disclosure provides articles. In some embodiments, articles are characterized by a surface that is or can be resistant to abrasion. In some embodiments, provided articles are characterized in that they are or can be resistance to color fading. In some embodiments, provided articles are successfully employed as wear resistant surfaces, such as flooring tiles.

In some embodiments, articles are useful for a wide range of surface covering applications, including but not limited to: flooring, walls, countertops, articles of furniture etc. in commercial, industrial, and residential applications. The present disclosure also provides methods of preparing and/or installing such coverings.

In some embodiments, provided articles comprise a design material directly applied to a base material. In some embodiments, a protective material is atop the design material and/or the base material. While not intending to be bound to a particular theory, it is believed that a lower modulus base layer in articles of the present disclosure provides resistance to incidence of indentation and/or wear.

In some embodiments, articles are engineered and/or fabricated from compositions. In some embodiments, provided compositions are or comprise materials that may be stacked on one another.

In some embodiments, provided materials (e.g. a base material) are or comprise multiple individual layers of material stacked on one another.

In some embodiments, the present disclosure provides compositions comprising a base material and a design material. It is apparent to those skilled in the art that a protective material may be separately applied after a design material has been applied on top of a base material.

Base Material

In some embodiments, compositions and/or articles formed from compositions comprise a base material.

In some embodiments, a base material provides a structural stability and/or solidity to compositions and articles formed and/or engineered from such compositions. In some embodiments, a base material provides an aesthetic background for application of a design material.

In some embodiments, a base material comprises about 99% of a thickness of a composition and/or an article, about 98% of a thickness of a composition and/or an article, about 97% of a thickness of a composition and/or an article, about 96% of a thickness of a composition and/or an article, about 95% of a thickness of a composition and/or an article, about 94% of a thickness of a composition and/or an article, about 93% of a thickness of a composition and/or an article, about 92% of a thickness of a composition and/or an article, about 91% of a thickness of a composition and/or an article, about 90% of a thickness of a composition and/or an article, about 89% of a thickness of a composition and/or an article, about 88% of a thickness of a composition and/or an article, about 87% of a thickness of a composition and/or an article, about 86% of a thickness of a composition and/or an article, about 85% of a thickness of a composition and/or an article, about 84% of a thickness of a composition and/or an article, about 83% of a thickness of a composition and/or an article, about 82% of a thickness of a composition and/or an article, about 81% of a thickness of a composition and/or an article, about 80% of a thickness of a composition and/or an article, about 75% of a thickness of a composition and/or an article, about 70% of a thickness of a composition and/or an article, about 65% of a thickness of a composition and/or an article, about 60% of a thickness of a composition and/or an article, about 55% of a thickness of a composition and/or an article, about 50% of a thickness of a composition and/or an article, or about 25% of a thickness of a composition and/or an article.

In some embodiments, preferred compositions and/or articles have a base material that comprises about 90% of a thickness of a composition and/or an article.

In some embodiments, a base material is or comprises layers.

In some embodiments, a base material is or comprises a polymer. In some embodiments, a base material is or comprises a polymer mixture.

In some embodiments, polymers and/or polymer mixtures as described herein are characterized by a melt flow index. A melt flow index provides an output rate, a flow (g/min), specifically, the mass in grams of a flow of a material at a designated temperature and pressure over a period of 10 minutes through a standard die having a standard diameter and length.

A melt flow index provides an indication of an ease of which a melt of a polymer flows. A higher a melt flow index of a material, the more flowable the material. That is, materials with a higher melt flow index show a lower material viscosity.

In some embodiments, a molecular weight of a polymer and/or polymer mixture affects a melt flow index for a polymer. A high melt flow rate corresponds with a low molecular weight polymer. In some embodiments, a presence of co-monomers in a polymer and/or polymer mixture can affect a melt flow index of a material.

In some embodiments, polymers and/or polymer mixtures for use in accordance with the present invention (e.g., in a base material) are characterized by a melt flow index as measured by ASTM D1238 in a range including: about 20 g/10 min to about 60 g/10 min; about 21 g/10 min to about 54 g/10 min; about 22 g/10 min to about 53 g/10 min; about 23 g/10 min to about 52 g/10 min; about 24 g/10 min to about 51 g/10 min; about 25 g/10 min to about 55 g/10 min; about 26 g/10 min to about 49 g/10 min; about 27 g/10 min to about 48 g/10 min; about 28 g/10 min to about 47 g/10 min; or between about 29 g/10 min to about 46 g/10 min.

In some embodiments, polymers and/or polymer mixtures for use in accordance with the present invention (e.g., in a base material) are characterized as having a melt flow index in a range of 35-45 g/10 min. measured by ASTM D1238.

In some embodiments, polymers and/or polymer mixtures are natural. In some embodiments, polymers and/or polymer mixtures are manufactured.

In some embodiments, polymers and/or polymer mixtures as described herein are or comprise copolymers or homopolymers. In some embodiments, a copolymer is a polyolefin copolymer. In some embodiments, a copolymer is a terpolymer. In some embodiments, a polymer mixture as described herein is blend of polymers, for example, a blend of any of the above listed polymers, such as for example, a blend of a terpolymer with a copolymer.

In some embodiments, polymers and/or polymer mixtures as described herein are elastomeric polymers. In some embodiments, elastomers are characterized by polymer chains that form cross links when cured. Exemplary elastomers include, for example, ethylene-vinyl acetate, ethylene propylene rubber, ethylene propylene diene rubber, polyisoprene or natural rubber, polybutadiene, polyisobutylene, or polyurethanes.

In some embodiments, polymers and/or polymer mixtures as described herein are or comprise a thermoplastic polymer. A thermoplastic elastomer is a copolymer. In some embodiments, thermoplastic polymers are characterized in that when its shape is altered at elevated temperatures, unlike some rubber materials, theremoplastic materials resist deformation, that is, these material retain their shape. Some exemplary thermoplastic elastomeric polymers include, for example, polyethylene, polypropylene, polystyrene, polyesters, polycarbonate, nylon, poly(methyl methacrylate). In some embodiments, a polymer and/or polymer mixture as described herein is or comprises a thermoplastic polyurethane. In some embodiments, a thermoplastic polyurethane is or comprises a polyethylene, polypropylene, polymethylpentene, polybutene, or combinations thereof. In some embodiments, a polymer and/or polymer mixture as described herein is or comprises a thermoplastic polyolefin.

In some embodiments, a preferred copolymer is ethylene-vinyl acetate (hereafter "EVA").

In some embodiments, polymers and/or polymer mixtures comprise: about 1% by weight of a base material, about 2% by weight of a base material, about 3% by weight of a base material, about 4% by weight of a base material, about 5% by weight of a base material, about 6% by weight of a base material, about 7% by weight of a base material, about 8% by weight of a base material, about 9% by weight of a base material, about 10% by weight of a base material, about 11% by weight of a base material, about 12% by weight of a base material, about 13% by weight of a base material, about 14% by weight of a base material, about 15% by weight of a base material, about 20% by weight of a base material, about 25% by weight of a base material, about 30% by weight of a base material, about 35% by weight of a base material, about 40% by weight of a base material, about 45% by weight of a base material, or about 50% by weight of a base material.

In some embodiments, preferred base materials comprise a polymer and/or polymer mixtures comprising about 5% to about 30% by weight of a base material.

In some embodiments, a base material also includes a binder. A binder holds a base material together. In some embodiments, a binder is an organic material. In some embodiments, a binder is a polymer, for example, EVA. In some embodiments, a binder includes: tackifiers, rheology modifiers, and/or plasticizers. In some embodiments, a tackifier is or comprises hydrocarbons and/or rosin esters. In some embodiments, a rheology modifier is a low molecular weight additive. In some embodiments, a binder is or comprises polymer flakes that crosslink thereby sticking together. In some embodiments, a binder includes additives. In some embodiments, a binder includes flow agents. In some embodiments, a binder includes stabilizers.

In some embodiments, binder content of a base material affects an overall level of rigidity of an article. In some embodiments, total organic content of a binder of a base material is less than about 35% by weight, more preferably less than about 20% or less by weight, more preferably less than about 18% or less by weight, or more preferably less than about 17% or less by weight. In some embodiments, total organic content of a binder of a base material is approximately 26% by weight or approximately 28% by weight may also be used.

In some embodiments, a binder comprises: about 1% by weight of a base material, about 2% by weight of a base material, about 3% by weight of a base material, about 4% by weight of a base material, about 5% by weight of a base material, about 6% by weight of a base material, about 7% by weight of a base material, about 8% by weight of a base material, about 9% by weight of a base material, about 10% by weight of a base material, about 15% by weight of a base material, about 20% by weight of a base material, about 25% by weight of a base material, about 30% by weight of a base material, about 35% by weight of a base material, or about 40% by weight of a base material, about 45% by weight of a base material.

In some embodiments, a binder comprises between about 10% to about 25% by weight of a base material.

In some embodiments, pigments and fillers comprise a balance of a percentage by weight of a base material.

In some embodiments, a base material includes at least one pigment. In some embodiments, pigments provide shading for a base material. In some embodiments, pigments include, for example, titanium dioxide.

In some embodiments, a base material includes fillers. In some embodiments, fillers are or include calcium carbonate, limestone, dolomite, amorphous silica, recycled materials, (e.g., dry wall dust), or combinations thereof.

In some embodiments, a base material comprises an aesthetic background layer. In some embodiments, a base material comprises an aesthetic background layer applied as a layer on top of a calendared web of a polymer and/or polymer mixture. In some embodiments, an aesthetic background layer is white or colored and provides a background for subsequent application of a design material. In some embodiments, an aesthetic background layer is or provides a consistent white on which a design material is later applied. In some embodiments, an aesthetic background layer is a "white pad coating." In some embodiments, an aesthetic background layer is UV cured or curable. In some embodiments, an aesthetic background layer is moisture cured or curable. In some embodiments, an aesthetic background layer is water-borne. In some embodiments, an aesthetic background layer is applied by any means known in the art, for example, roll coating.

In some embodiments, a top of a base material is sanded smooth prior to application of an aesthetic background layer. In some embodiments, providing a smooth top layer of a base material improves adhesion of subsequent layers. In some embodiments, a top layer of a base material has a sanded surface. In some embodiments, a top layer of a base material has a corona treated surface. In some embodiments, a top layer of a base material has a flame treated surface.

In some embodiments, an aesthetic background layer is tinted with a color or white.

In some embodiments, an aesthetic background layer has an application weight in a range between about 10 $g/m^2$ and about 200 $g/m^2$. In some embodiments, an aesthetic background layer has an application weight about 1 $g/m^2$, about 2 $g/m^2$, about 3 $g/m^2$, about 4 $g/m^2$, about 5 $g/m^2$, about 6 $g/m^2$, about 7 $g/m^2$, about 8 $g/m^2$, about 9 $g/m^2$, about 10 $g/m^2$, about 15 $g/m^2$, about 20 $g/m^2$, about 25 $g/m^2$, about 30 $g/m^2$, about 35 $g/m^2$, about 40 $g/m^2$, about 45 $g/m^2$, about 50 $g/m^2$, about 55 $g/m^2$, about 60 $g/m^2$, about 65 $g/m^2$, about 70 $g/m^2$, about 75 $g/m^2$, about 80 $g/m^2$, about 85 $g/m^2$, about 90 $g/m^2$, about 95 $g/m^2$, about 100 $g/m^2$, about 110 $g/m^2$, about 115 $g/m^2$, about 120 $g/m^2$, about 125 $g/m^2$, about 130 $g/m^2$, about 135 $g/m^2$, about 140 $g/m^2$, about 145 $g/m^2$, about 150 $g/m^2$, about 155 $g/m^2$, about 160 $g/m^2$, about 165 $g/m^2$, about 170 $g/m^2$, about 175 $g/m^2$, about 180 $g/m^2$, about 185 $g/m^2$, about 190 $g/m^2$, about 195 $g/m^2$, about 200 $g/m^2$ or more.

In some embodiments, an aesthetic background layer has good adhesion to a base material. In some embodiments, an aesthetic background layer has good adhesion with a design material. In some embodiments, an aesthetic background layer is a moisture cured polyurethane hot melt coating. In some embodiments, an aesthetic background layer is a hot coat, for example, a coating applied with HotCoating® Technology.

In some embodiments, an aesthetic background layer adheres to a base material and/or a design material at arid and humid conditions. In some embodiments, an aesthetic background layer adheres to a base material and/or a design material at a relative humidity of about 1%, a relative humidity of about 2%, a relative humidity of about 3%, a relative humidity of about 4%, a relative humidity of about 5%, a relative humidity of about 10%, a relative humidity of about 15%, a relative humidity of about 20%, a relative humidity of about 25%, a relative humidity of about 30%, a relative humidity of about 35%, a relative humidity of about 40%, a relative humidity of about 45%, a relative humidity of about 50%, a relative humidity of about 55%, a relative humidity of about 60%, a relative humidity of about 65%, a relative humidity of about 70%, a relative humidity of about 75%, a relative humidity of about 80%, a relative humidity of about 85%, a relative humidity of about 90%, a relative humidity of about 95%, or a relative humidity of about 100%.

In some embodiments, an aesthetic background layer adheres to a base material and/or a design material at any operable temperature.

In some embodiments, an aesthetic background layer adheres to a base material and/or a design material at acidic and alkaline conditions.

In some embodiments, a base material does not break, cleave, crack, or crumble when embossed. In some embodiments, a base material does not break, cleave, crack, or crumble when edges are rounded, beveled, or depressed.

In some embodiments, an aesthetic background layer comprises: about 10% by weight of a base material, about 9% by weight of a base material, about 8% by weight of a base material, about 7% by weight of a base material, about 6% by weight of a base material, about 5% by weight of a base material, about 4% by weight of a base material, about 3% by weight of a base material, about 2% by weight of a base material, about 1% by weight of a base material, about 0.5% by weight of a base material, about 0.25% by weight of a base material, about 0.10% by weight of a base material, or about 0.005% by weight of a base material.

In some embodiments, a base material comprises a UV cured or curable primer layer. In some embodiments, a UV cured or curable primer layer is clear. In some embodiments, a UV cured or curable primer layer is useful to maximize clarity and print resolution of a design material when a design material is printed on a base material. In some embodiments, a UV cured or curable primer layer is a component of an aesthetic background layer. In some embodiments, a UV cured or curable primer layer is top of an aesthetic background layer. In some embodiments, a UV cured or curable primer layer is on top of a base material.

In some embodiments, a UV cured or curable primer layer has an application weight in a range between about 5 $g/m^2$ and about 20 $g/m^2$. In some embodiments, a UV cured or curable primer layer has an application weight about 0.5 $g/m^2$, about 1 $g/m^2$, about 2 $g/m^2$, about 3 $g/m^2$, about 4 $g/m^2$, about 5 $g/m^2$, about 6 $g/m^2$, about 7 $g/m^2$, about 8 $g/m^2$, about 9 $g/m^2$, about 10 $g/m^2$, about 11 $g/m^2$, about 12 $g/m^2$, about 13 $g/m^2$, about 14 $g/m^2$, about 15 $g/m^2$, about 16 $g/m^2$, about 17 $g/m^2$, about 18 $g/m^2$, about 19 $g/m^2$, about 20 $g/m^2$, about 21 $g/m^2$, about 22 $g/m^2$, about 23 $g/m^2$, about 24 $g/m^2$, about 25 $g/m^2$, about 30 $g/m^2$, about 35 $g/m^2$ or more.

In some embodiments, provided articles do not curl when an aesthetic background layer and/or a UV cured or curable primer layer is added to a base material.

In some embodiments, a base material is or comprises multiple layers of a base material stacked on one another.

In some embodiments, methods for forming a base material includes blending components of a base material, for example, a polymer and/or polymer mixture, a tackifier, a filler, additives, flow agents, and/or stabilizers.

In some embodiments, methods of forming a base material includes blending components is in a mixer. In some embodiments, blending is at an elevated temperature. In some embodiments, an elevated temperature is: at least about 75° F., at least about 100° F., at least about 150° F., at least about 175° F., at least about 200° F., at least about 225° F., at least about 250° F., at least about 275° F., at least about 300° F., at least about 325° F., at least about 350° F., at least about 375° F., at least about 400° F., at least about 425° F., at least about 450° F., at least about 475° F., or at least about 500° F.

In some embodiments, methods of forming a base material further includes a step of calendaring a liquid polymer and/or polymer mixture into a web.

In some embodiments, methods of forming a base material further includes a step of cooling a base material from an elevated temperature.

In some embodiments, methods of forming a base material further includes a step of punching a tile shape out of a web.

Design Material

In some embodiments, provided compositions comprise a base material and at least one design material on a base material.

In some embodiments, a design material forms a pattern or aesthetic on a surface a base material. In some embodiments, a design material provides a photo-realistic image of a desired aesthetic.

In some embodiments, a design material comprises at least one pigment. In some embodiments, a design material comprises at least one dye. In some embodiments, a design material comprises one or more inks.

In some embodiments, an ink is or comprises a UV cured or curable ink. In some embodiments, inks as described herein include water-based inks. In some embodiments, inks as described herein include latex-based inks. In some embodiments, inks as described herein include solvent-based inks.

In some embodiments, a design material comprises at least one colorant, such as an ink, pigment, or dye or combination thereof. In some embodiments, any organic and/or inorganic pigments and dyes can be included in inks. In some embodiments, other organic and/or inorganic pigments, dyes, inks or combinations thereof can be used to achieve desired colors. It must be appreciated that design materials and directly applied design materials are known to those skilled in the art.

In some embodiments, a design material is or comprises multiple layers, for example, multiple layers of ink, pigment, dye, or combinations thereof.

In some embodiments, methods of forming a design material on a surface of or into a base material includes designing an aesthetic, for example, a unique nature inspired visual. In some embodiments, such an aesthetic has minimal repeats.

In some embodiments, methods of forming a design material include a step of printing, depositing, jetting, and/or extruding an ink or dye on a surface or into a base material. In some embodiments, methods of forming a design material include a step of directly printing, depositing, jetting, and/or extruding an ink or dye on a surface or into a base material.

In some embodiments, methods of forming a design material on a surface of or into a base material includes use of techniques including printing, depositing, jetting, and/or extruding material as are known in the art.

In some embodiments, methods of printing, depositing, jetting, and/or extruding material for forming a design material on a surface of a base material includes, for example, ink jet printing, dye sublimation printing, or direct printing.

In some embodiments, a printer useful for printing is known in the art. In some embodiments, for example, a printer is a single pass printer, a printer is a fixed array printer, a printer is a rastering printer or a printer is a moving head printer.

In some embodiments, such an aesthetic has high resolution. In some embodiments, resolution is in a range of at least about 50 to about 600 dpi. In some embodiments, resolution is: at least about 50 dpi, at least about 100 dpi, at least about 150 dpi, at least about 200 dpi, at least about 250 dpi, at least about 300 dpi, at least about 350 dpi, at least about 400 dpi, at least about 450 dpi, at least about 500 dpi, at least about 550 dpi, at least about 600 dpi, at least about 650 dpi, at least about 700 dpi, or at least about 750 dpi.

In some embodiments, methods of forming a design material further include a step of curing a design material.

In some embodiments, methods of forming a designed base material further includes a step of punching a tile shape out of a web.

Protective Material

In some embodiments, compositions as described herein comprises a base material, a design material, and a clear material atop the design material.

Generally, any material disposed of on top of a design material may be used to protect.

In some embodiments, a protective material is moisture cured or curable. In some embodiments, a protective material is a moisture cured polyurethane hot melt coating. In some embodiments, an aesthetic background layer is a hot coat, for example, a coating applied with HotCoating® Technology. In some embodiments, methods of applying a clear material includes heated roll coating. Although, any methods for application known to those skilled in the art may be employed.

In some embodiments, a moisture cured polyurethane hot melt coating has an application weight in a range between about 10 g/m$^2$ and about 200 g/m$^2$. In some embodiments, an aesthetic background layer has an application weight about 1 g/m$^2$, about 2 g/m$^2$, about 3 g/m$^2$, about 4 g/m$^2$, about 5 g/m$^2$, about 6 g/m$^2$, about 7 g/m$^2$, about 8 g/m$^2$, about 9 g/m$^2$, about 10 g/m$^2$, about 15 g/m$^2$, about 20 g/m$^2$, about 25 g/m$^2$, about 30 g/m$^2$, about 35 g/m$^2$, about 40 g/m$^2$, about 45 g/m$^2$, about 50 g/m$^2$, about 55 g/m$^2$, about 60 g/m$^2$, about 65 g/m$^2$, about 70 g/m$^2$, about 75 g/m$^2$, about 80 g/m$^2$, about 85 g/m$^2$, about 90 g/m$^2$, about 95 g/m$^2$, about 100 g/m$^2$, about 110 g/m$^2$, about 115 g/m$^2$, about 120 g/m$^2$, about 125 g/m$^2$, about 130 g/m$^2$, about 135 g/m$^2$, about 140 g/m$^2$, about 145 g/m$^2$, about 150 g/m$^2$, about 155 g/m$^2$, about 160 g/m$^2$, about 165 g/m$^2$, about 170 g/m$^2$, about 175 g/m$^2$, about 180 g/m$^2$, about 185 g/m$^2$, about 190 g/m$^2$, about 195 g/m$^2$, about 200 g/m$^2$ or more.

In some embodiments, a moisture cured polyurethane hot melt coating has good adhesion to a design material, for example a UV cured or curable ink.

In some embodiments, a moisture cured polyurethane hot melt coating is a moisture cured hot melt PUR coating. In some embodiments, a moisture cured polyurethane hot melt coating has aluminum oxide. In some embodiments, a moisture cured polyurethane hot melt coating is Kleibeit's HotCoating® Technology. In some embodiments, a moisture cured polyurethane hot melt coating is a similar process.

In some embodiments, a moisture cured polyurethane hot melt coating adheres to a design material at arid and humid conditions. In some embodiments, an aesthetic background layer adheres to a design material at a relative humidity of about 1%, a relative humidity of about 2%, a relative humidity of about 3%, a relative humidity of about 4%, a relative humidity of about 5%, a relative humidity of about 10%, a relative humidity of about 15%, a relative humidity of about 20%, a relative humidity of about 25%, a relative humidity of about 30%, a relative humidity of about 35%, a relative humidity of about 40%, a relative humidity of about 45%, a relative humidity of about 50%, a relative humidity of about 55%, a relative humidity of about 60%, a relative humidity of about 65%, a relative humidity of about 70%, a relative humidity of about 75%, a relative humidity of about 80%, a relative humidity of about 85%, a relative humidity of about 90%, a relative humidity of about 95%, or a relative humidity of about 100%.

In some embodiments, a protective material comprising a moisture cured polyurethane hot melt coating adheres to a design material at any operable temperature.

In some embodiments, a protective material comprising a moisture cured polyurethane hot melt coating adheres to a design material at acidic and alkaline conditions.

In some embodiments, an article having a protective material does not break, cleave, crack, or crumble when embossed. In some embodiments, an article having a protective material does not break, cleave, crack, or crumble when edges are rounded, beveled, or depressed.

In some embodiments, a protective material comprises a clear material configured to resist mechanical damage. In some embodiments, a clear material is configured to resist scuffs, scratches, mars, and/or abrasions.

In some embodiments, a protective material is a single layer. In some embodiments, a protective material is a composite. In some embodiments, a clear material is or comprises multiple layers of a clear material stacked on one another.

In some embodiments, a protective material includes a clear material adhered atop a design material. In some embodiments, a clear material is designed to resist mechanical damage, such as rips or tears.

In some embodiments, a clear material comprises a polymeric film.

In some embodiments, clear material is a liquid. In some embodiments, a clear material is designed to exhibit superior adhesion to a surface of a design material and/or a base material.

In some embodiments, a clear material has an application weight of about 5 g/m$^2$, about 10 g/m$^2$, about 20 g/m$^2$, about 30 g/m$^2$, about 40 g/m$^2$, about 50 g/m$^2$, about 60 g/m$^2$, about 80 g/m$^2$, about 90 g/m$^2$, about 100 g/m$^2$, about 110 g/m$^2$, about 120 g/m$^2$, about 130 g/m$^2$, about 140 g/m$^2$, 150 g/m$^2$, 160 g/m$^2$, 170 g/m$^2$, 180 g/m$^2$, 190 g/m$^2$, 200 g/m$^2$, 210 g/m$^2$, 220 g/m$^2$, 230 g/m$^2$, 240 g/m$^2$, or about 250 g/m$^2$.

In some embodiments, a thickness of a clear material is about 0.25 mils, about 0.5 mils, about 0.75 mils, about 1 mil, about 1.25 mils, 1.5 mils, 1.75 mils, 2 mils, about 2.25 mils, 2.5 mils, 2.75 mils, 3 mils, about 3.25 mils, 3.5 mils, 3.75 mils, 4 mils, about 4.25 mils, 4.5 mils, 5.75 mils, about 5 mils, about 6 mils, 7 mils, 8 mils, 9 mils, or about 10 mils. In some embodiments, a thickness of a clear material is any thickness but preferred articles have a clear material having a thickness of approximately 3 mils.

In some embodiments, methods of applying a clear material includes roll coating. Although, any methods for application known to those skilled in the art may be employed.

In some embodiments, methods of applying a protective material includes a step of curing. In some embodiments, a curing step is an active step. In some embodiments, an active curing step comprises UV curing, e-beam curing, and/or curing with an elevated temperature.

In some embodiments, a composition as described herein comprises, in order: a base material, a design material, a clear material, and a top coat material.

In some embodiments, a protective material includes a top coat material adhered atop a clear material. In some embodiments, a top coat material is designed to resist scratches, scuffs, mars, and/or abrasions.

In some embodiments, a top coat material is configured to provide a glossy aesthetic. In some embodiments, a glossy aesthetic is configured to have a flat appearance. In some embodiments, a glossy aesthetic is configured to have a high gloss appearance. In some embodiments, a glossy aesthetic is configured to have a semi-gloss appearance. In some embodiments, a top coat material is designed to have a gloss range between 5-95%.

In some embodiments, a top coat material is configured to provide resistance to water. In some embodiments, a top coat material is insoluble in water.

In some embodiments, a top coat material comprises a urethane film. In some embodiments, a top coat material may also comprise, for example, aluminum oxide or nylon particles. In some embodiments, a top coat material may have visible texture. Various top coat materials may be used in the present disclosure are described in U.S. patent application Ser. No. 09/765,713 now U.S. Pat. No. 6,730,388, entitled "Coating Having Macroscopic Texture and Process for Making Same," filed on Jan. 19, 2001, which is incorporated herein by reference in its entirety.

In some embodiments, a top coat material has an application weight of about 5 g/m$^2$, about 10 g/m$^2$, about 20 g/m$^2$, about 30 g/m$^2$, about 40 g/m$^2$, about 50 g/m$^2$, about 60 g/m$^2$, about 80 g/m$^2$, about 90 g/m$^2$, about 100 g/m$^2$, about 110 g/m$^2$, about 120 g/m$^2$, about 130 g/m$^2$, about 140 g/m$^2$, or about 150 g/m$^2$.

In some embodiments, a thickness of a top coat material is about 0.25 mils, about 0.5 mils, about 0.75 mils, about 1 mil, about 1.25 mils, 1.5 mils, 1.75 mils, 2 mils, about 2.25 mils, 2.5 mils, 2.75 mils, 3 mils, about 3.25 mils, 3.5 mils, 3.75 mils, 4 mils, about 4.25 mils, 4.5 mils, 5.75 mils, about 5 mils, about 6 mils, 7 mils, 8 mils, 9 mils, or about 10 mils.

In some embodiments, top coat is a liquid. In some embodiments, a top coat is designed to exhibit superior adhesion to a surface of a protective material.

In some embodiments, a top coat material is or comprises multiple layers of a top coat material stacked on one another.

In some embodiments, methods of applying a top coat material includes roll coating. Although, any methods for application known to those skilled in the art may be employed.

In some embodiments, methods of applying a top coat material includes a step of curing. In some embodiments, a curing step is an active step. In some embodiments, an active curing step comprises UV curing, e-beam curing, and/or curing with an elevated temperature.

In some embodiments, methods of applying a top coat material includes a step of embossing.

Articles

In some embodiments, provided articles are compositions that comprise a base material and a design material. In some embodiments, articles useful as a surface covering are compositions that comprise a base material, a design material, and a protective material.

In some embodiments, provided articles comprise for example a base material comprising an EVA copolymer, a moisture cured polyurethane hot melt coating, and a UV cured or curable primer. In some embodiments, provided articles comprise for example a design material comprising a UV cured or curable ink. In some embodiments, provided articles comprise for example a protective material comprising a moisture cured polyurethane hot melt coating. In some embodiments, provided articles comprise for example a protective material comprising a moisture cured polyurethane hot melt coating with a UV cured or curable clear top coating.

In some embodiments, articles as described herein are characterized in that they are resilient to various forms of mechanical wear and/or damage. In some embodiments, mechanical damage includes, for example, scratches, scuffs, abrasions, dents, mars, fading (e.g. color fading) or combinations thereof, for example, even after prolonged normal use.

In some embodiments, abrasion resistance is assessed through a progressive abrasion of a protective material. In some embodiments, using an abrader, abrasion of a coating can be performed similar to the ASTM Method D4060. In some embodiments, a number of wear cycles is established when an abrader reaches a top surface of a design material. In some embodiments, a higher number of cycles correlates with enhanced resistance to wear, including resistance to scuff, abrasions, scratches, and/or mars.

In some embodiments, articles have a thicknesses of: about 0.25 mm, about 0.5 mm, about 0.75 mm, about 1 mm, about 1.5 mm, about 2 mm, about 2.5 mm, about 3 mm, about 3.175 mm, about 3.5 mm, about 4 mm, about 4.5 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 35 mm, about 40 mm, about 45 mm, about 50 mm, about 55 mm, about 60 mm, about 65 mm, about 70 mm, about 75 mm, about 80 mm, about 85 mm, about 90 mm, about 95 mm, about 100 mm, about 150 mm, about 200 mm, about 250 mm, about 300 mm, about 400 mm, about 500 mm, or about 1000 mm.

In some embodiments, articles have thicknesses in a range from: about 0.5 mm to 20 mm, about 1 mm to 15 mm, about 2 mm to 10 mm, or about 3 mm to 5 mm.

In some embodiments, preferred articles have a thickness of about 3.175 mm.

In some embodiments, preferred articles have a thickness of about 4 mm.

In some embodiments, provided articles are characterized by a Taber abrasion value of at least about 2000 cycles to wear through a protective material having a thickness of at least 2 mils and continue until exposing a top surface of a design material. In some embodiments, articles as described herein are characterized by a Taber abrasion value to wear through a protective material having a thickness of at least 2 mils of: at least about 2100 cycles, at least about 2200 cycles, at least about 2300 cycles, at least about 2400 cycles, at least about 2500 cycles, at least about 2600 cycles, at least about 2700 cycles, at least about 2800 cycles, at least about 2900 cycles, at least about 3000 cycles, at least about 3100 cycles, at least about 3200 cycles, at least about 3300 cycles, at least about 3400 cycles, at least about 3500 cycles, at least about 3600 cycles, at least about 3700 cycles, at least about 3800 cycles, at least about 3900 cycles, at least about 4000 cycles, at least about 4100 cycles, at least about 4200 cycles, at least about 4300 cycles, at least about 4400 cycles, at least about 4500 cycles, at least about 4600 cycles, at least about 4700 cycles, at least about 4800 cycles, at least about 4900 cycles, or at least about 5000 cycles.

In some embodiments, provided articles are characterized in that they are resistant to color fading.

In some embodiments, an extent to which color fades or changes over time due to exposure to heat, light, wear, etc. is quantized and/or may be assessed through a difference or a distance between colors, a Delta E (ΔE).

A visibility, or the lack thereof, of a change in color can be determined by measuring a color change (Delta E, ΔE) of an article, surface covering. The color change is a composite of three variables, lightness (L*), red/green value (a*), and yellow/blue value (b*). A color change of a surface covering material is assessed, for example, using a spectrophotometer and measuring a ΔE before and after an exposure.

In some embodiments, provided articles are characterized in that they are light stable and resistant to color fading over time. In some embodiments, provided articles are characterized by a Delta E of less than 5 following Xenon Arc Exposure for at least 400 hours. In some embodiments, articles as described herein are characterized by a Delta E value of less than 5 following UV exposure for: at least about 450 hours, at least about 500 hours, at least about 550 hours, at least about 600 hours, at least about 650 hours, at least about 700 hours, at least about 750 hours, at least about 800 hours, at least about 850 hours, at least about 900 hours, at least about 1000 hours, at least about 2000 hours, at least about 2500 hours, or at least about 5000 hours. In some embodiments, articles as described herein are characterized by a Delta E value of less than 10 following UV exposure for: at least about 400 hours, at least about 500 hours, at least about 600 hours, at least about 700 hours, at least about 800 hours, at least about 900 hours, at least about 1000 hours, at least about 2000 hours, at least about 3000 hours, at least about 4000 hours, at least about 5000 hours, at least about 7500 hours, or at least about 10000 hours.

In some embodiments, provided articles are characterized in that they are flexible. In some embodiments, flexibility is assessed through an evaluation of a rigidity of an article. In some embodiments, rigidity of an article is found through a determination of a ratio of the stress along an axis over the strain along that axis, that is Young's modulus for an article.

In some embodiments, provided articles are characterized by a Young's modulus of less than about 1000 lbs./in. In some embodiments, articles as described herein are characterized by a Young's modulus of less than about 250 lbs./in., of less than about 300 lbs./in., of less than about 350 lbs./in., of less than about 400 lbs./in., of less than about 450 lbs./in., of less than about 500 lbs./in., of less than about 550 lbs./in., of less than about 600 lbs./in., of less than about 650 lbs./in., of less than about 700 lbs./in., of less than about 750 lbs./in., of less than about 800 lbs./in., of less than about 850 lbs./in., of less than about 900 lbs./in., of less than about 1000 lbs./in., of less than about 1250 lbs./in., of less than about 1500 lbs./in., of less than about 1750 lbs./in., or of less than about 2000 lbs./in.

While not intending to be bound to a theory, it is believed that articles described herein that are assembled from materials as described herein are a result of an expansion match of materials. In some embodiments, articles as described herein have a simplified construction. In some embodiments, articles as described herein do not require "balancing" layers to remain flat.

In some embodiments, a thickness of an article as described herein is any desired thickness. In some embodiments, a preferred thickness for an entire surface covering article is approximately 4 mm.

In some embodiments, provided articles are characterized in that their colors and/or designs do not do not fade when exposed to wet or moist environments. In some embodiments, provided articles are resistant to fading in highly alkaline environments, for example environments having a pH of about 7 to about 14.

In some embodiments, provided articles are characterized in that the layers do not separate when exposed to wet or moist environments. In some embodiments, provided articles are resistant to delamination, peeling, or separation in moist environments, for example environments having a pH between about 7 and about 14.

In some embodiments, a shape of an article of the present disclosure is any desirable shape. In some embodiments, a shape of an article of the present disclosure is a square. In some embodiments, a square shaped surface covering article is for example 9"×9", 12"×12", 14"×14", 16"×16", 18"×18", 2'×2', 4'×4', or more. In some embodiments, a shape of an article of the present disclosure is a rectangle. In some embodiments, a rectangular shaped surface covering article is for example 1'×2', 2'×4', or 4'×8' or more. In some embodiments, a shape of an article of the present disclosure is an octagon. In some embodiments, a shape of an article of the present disclosure is any geometric shape. In some embodiments, a shape of an article of the present disclosure is any shape.

In some embodiments, articles as described herein may have rounded, beveled, or depressed edges or may be mechanically embossed. In some embodiments, articles do not break, cleave, crack, or crumble when embossed or the edges are rounded, beveled, or depressed.

Manufacturing Articles

In some embodiments, the present disclosure includes methods of manufacturing materials, compositions, and/or articles as described herein.

In some embodiments, articles are manufactured from compositions and materials as described herein. In some embodiments, articles useful as a surface covering comprise a base material and a design material. In some embodiments, articles useful as a surface covering comprise a base material; a design material; and a protective material.

In some embodiments, methods of manufacturing compositions and/or articles as provided herein comprises assembling an article from a bottom material up through a top material.

In some embodiments, methods of manufacturing compositions and/or articles as provided herein comprises assembling layers of materials. In some embodiments, methods of manufacturing provided articles for example comprise forming a base material comprising an EVA copolymer, applying a moisture cured polyurethane hot melt coating and a UV cured or curable primer. In some embodiments, methods of manufacturing provided articles for example comprise printing a design material comprising a UV cured or curable ink. In some embodiments, methods of manufacturing provided articles comprise for example applying a protective material comprising a moisture cured polyurethane hot melt coating. In some embodiments, methods of manufacturing provided articles for example comprise applying a protective material comprising a moisture cured polyurethane hot melt coating with a UV cured or curable clear top coating.

In some embodiments, methods of manufacturing articles comprise forming a base material. In some embodiments, methods of forming a base material include blending of base material components, for example, a polymer and/or polymer mixture. In some embodiments, blending base material components is done in a mixer.

In some embodiments, methods of forming a base material include melting a polymer and/or polymer mixture at elevated temperature. In some embodiments, an elevated temperature is: at least about 75° F., at least about 100° F., at least about 150° F., at least about 175° F., at least about 200° F., at least about 225° F., at least about 250° F., at least about 275° F., at least about 300° F., at least about 325° F., at least about 350° F., at least about 375° F., at least about 400° F., at least about 425° F., at least about 450° F., at least about 475° F., or at least about 500° F.

In some embodiments, methods of forming a base material further includes a step of calendaring a liquid polymer and/or polymer mixture into a web. In some embodiments, calendaring comprises rolling or smoothing a liquid polymer and/or polymer mixture.

In some embodiments, methods of forming a base material further include a step of cooling a base material from an elevated temperature.

In some embodiments, methods of forming a base material further include a step of finishing a top layer of a base material so that it is smooth. In some embodiments, methods of forming a base material further includes a step of sanding a base material prior to application of an aesthetic background layer. In some embodiments, a sanding step uses a sanding surface having a grit between about 50 grit and about 500 grit. In some embodiments, a sanding step uses a sanding surface having a grit of about 50 grit, about 100 grit, about 150 grit, about 200 grit, about 250 grit, about 300 grit, about 350 grit, about 400 grit, about 450 grit, or about 500 grit. In some embodiments, methods of forming a base material further includes a step of corona treating a top layer of a base material. In some embodiments, methods of forming a base material further includes a step of flame treating a top layer of a base material. In some embodiments, surface treatment to form a smooth surface for a top layer of a base material can be accomplished using any means known or combinations thereof.

In some embodiments, methods further comprise a step of curing and/or laminating a calendared base material. Curing as used herein, refers to a process of setting (e.g., by evaporation (drying) and/or cross-linking) a material. In some embodiments, the curing step is an active cure. In some embodiments, the curing step is a passive cure. In some embodiments, curing includes and/or is performed by exposure to ambient conditions, heat, radiation, and/or by cross-linking (e.g., oxidative cross-linking).

In some embodiments, methods of manufacturing compositions and/or articles as provided herein comprises adding an aesthetic background layer atop a base material. In some embodiments, an aesthetic background layer is applied by methods known in the art.

In some embodiments, an aesthetic background layer is a moisture cured polyurethane hot melt coating. In some embodiments, a moisture cured polyurethane hot melt coating is applied with a heated roll coater. In some embodiments, an aesthetic background layer is applied by HotCoating® Technology, which is described in U.S. Pat. No. 7,939,137 to Becker-Weimann et al., entitled "Method and Device for Producing Parts having a Sealing Layer of the Surface and Corresponding Parts", which is hereby incorporated by reference in its entirety herein. In some embodiments, a moisture cured polyurethane hot melt coating is applied with a heated roll coater, which is described in U.S. Ser. No. 13/954,199 now published as U.S. Patent Application Publication No. 2014/0037917 to Branch, entitled "Printed Laminate with Digital Printing and Method for Manufacturing", which is hereby incorporated by reference in its entirety herein.

In some embodiments, a moisture cured polyurethane hot melt coating is cured. Curing as used herein, refers to a process of setting (e.g., by evaporation (drying) and/or cross-linking) a material. In some embodiments, the curing step is an active cure. In some embodiments, the curing step is a passive cure. In some embodiments, curing includes and/or is performed by exposure to ambient conditions, heat, radiation, and/or by cross-linking (e.g., oxidative cross-linking). In some embodiments, a moisture cured polyurethane hot melt coating cures via crosslinking in polyurethane.

In some embodiments, when cured, a moisture cured polyurethane hot melt coating will hard bond to a surface. In some embodiments, cross-linking in a moisture polyurethane hot melt coating occurs during a period following application. In some embodiments, a moisture cured polyurethane hot melt coating slowly cures to form a hard bond with a surface. In some embodiments, a curing period for a moisture cured polyurethane hot melt coating is about 1 hour, about 2 hours, about 3 hours, about 4 hours, about 5 hours, about 6 hours, about 7 hours, about 8 hours, about 9 hours, about 10 hours, about 11 hours, about 12 hours, about 18 hours, about 1 day, about 2 days, about 3 days, about 4 days, about 5 days, about 6 days, about 1 week, about 2 weeks, about 3 weeks, about a month or more.

In some embodiments, a slow cure of a moisture cured polyurethane hot melt coating permits time after its application and before it is fully cured to emboss or edge an article. In some embodiments, when embossing or edging prior to fully curing a moisture cured polyurethane hot melt coating does not resulting in breaking, cleaving, cracking, or crumbling a base material and/or an aesthetic background layer.

In some embodiments, a moisture cured polyurethane hot melt coating will hard bond to a base material, for example, a base material such as an EVA copolymer. In some embodiments, a moisture cured polyurethane hot melt coating hard bonded to a surface is highly abrasion resistant. In some embodiments, a moisture cured polyurethane hot melt coating hard bonded to an EVA copolymer base surface is highly abrasion resistant.

In some embodiments, methods of manufacturing compositions and/or articles as provided herein further comprises adding a UV cured or curable primer atop a base material. In some embodiments, methods of manufacturing compositions and/or articles as provided herein further comprises adding a UV cured or curable primer atop a base material including a moisture cured polyurethane hot melt coating. In some embodiments, methods of manufacturing articles as provided herein comprise a step of curing a UV cured or curable primer.

In some embodiments, methods of manufacturing compositions and/or articles as provided herein comprises annealing a base material. While not wishing to be bound to a theory, it is believed that annealing will pre-shrink a base material so that articles are resistant to shrinkage following installation.

In some embodiments, methods of manufacturing compositions and/or articles as provided herein comprises forming a design material atop a base material.

In some embodiments, methods of manufacturing compositions and/or articles as provided herein include applying (e.g., printing) a design material atop a base material. In some embodiments, applying may be by directly applying (e.g. direct printing).

In some embodiments, methods of applying and/or directly applying a design material to a base material comprise printing, depositing, jetting, and/or extruding an ink, a pigment, or a dye on a surface of a base material or into a base material. In some embodiments, methods of applying a design material to a base material are known to those skilled in the art, for example, including printing, depositing, jetting, and/or extruding. In some embodiments, methods of applying a design material to a base material use techniques and equipment known in the art, for example, including: ink jet printing, dye sublimation printing, or direct printing, among others. In some embodiments, a printer useful for printing is known in the art. In some embodiments, for example, a printer is a single pass printer, a printer is a fixed array printer, a printer is a rastering printer or a printer is a moving head printer. In some embodiments, a printer is a 4 color printer, a 6 color printer, an 8 color printer, a 12 color printer, a 16 color printer, or more colors.

In some embodiments, methods of manufacturing articles as provided herein comprise a step of curing a UV cured or curable ink. In some embodiments, a cure is a passive cure. In some embodiments, a cure is an active cure as known in the art.

In some embodiments, methods of manufacturing articles as provided herein comprise a step of punching a tile having a desired shape out of a composition having a design material applied to a base material.

In some embodiments, methods of manufacturing an article further comprises a step of punching a shape out of a web having a designed material thereon.

In some embodiments, methods of manufacturing provided articles further comprises a step of applying a moisture cured polyurethane hot melt coating atop a design material. In some embodiments, a step of applying a moisture cured polyurethane hot melt coating comprises heated roll coating. In some embodiments, a step of applying a moisture cured polyurethane hot melt coating comprises methods know to those of skill in the art.

In some embodiments, methods of manufacturing compositions and/or articles as provided herein further comprises a step of curing. In some embodiments, a curing step is an active step. In some embodiments, an active curing step comprises UV curing, e-beam curing, and/or curing with an elevated temperature. Curing as used herein, refers to a process of setting (e.g., by evaporation (drying) and/or cross-linking) a material. In some embodiments, the curing step is an active cure. In some embodiments, the curing step is a passive cure. In some embodiments, curing includes and/or is performed by exposure to ambient conditions, heat, radiation, and/or by cross-linking (e.g., oxidative cross-linking).

In some embodiments, a moisture cured polyurethane hot melt coating will hard bond to a design material, for example, a UV cured or curable ink.

In some embodiments, methods of manufacturing compositions and/or articles as provided herein further comprise a step of applying a clear material atop a design material. In some embodiments, methods of manufacturing compositions and/or articles as provided herein further comprises a step of applying a clear material includes roll coating. In some embodiments, a clear material can be applied in a single coat or multiple coats using a roller. Although, any methods for application known to those skilled in the art may be employed. For example, in some embodiments, clear material application may be accomplished by spraying (such as aerosol spraying). In some embodiments, clear material application may be accomplished by brushing, or using other types of applicators. In some embodiments, a clear material may be applied using a foam roller in a single coat or multiple coats.

In some embodiments, methods of manufacturing as provided herein further comprise a step of applying a top coat material on top of or as a part of a protective material. In some embodiments, methods of applying a top coat material include roll coating. In some embodiments, top coat materials can be applied in a single coat or multiple coats using a roller. Although, any methods for application known to those skilled in the art may be employed. For example, in some embodiments, top coat material application may be accomplished by spraying (such as aerosol spraying), in some embodiments, top coat material application may be accomplished by brushing, or using other types of applicators. In some embodiments, a top coat material may be applied using a foam roller in a single coat or multiple coats.

In some embodiments, methods of manufacturing an article further comprise a step of applying a top coat material includes a step of curing. In some embodiments, a curing step is an active step. In some embodiments, an active curing step comprises UV curing, e-beam curing, and/or curing with an elevated temperature. Curing as used herein, refers to a process of setting (e.g., by evaporation (drying) and/or cross-linking) a material. In some embodiments, the curing step is an active cure. In some embodiments, the curing step is a passive cure. In some embodiments, curing includes and/or is performed by exposure to ambient conditions, heat, radiation, and/or by cross-linking (e.g., oxidative cross-linking).

In some embodiments, methods of manufacturing an article further comprises a step of curing and/or laminating an article. In some embodiments, curing an article comprises a process of setting a material. In some embodiments, the curing step is an active cure. In some embodiments, the curing step is a passive cure. In some embodiments, curing includes and/or is performed by exposure to ambient conditions, heat, radiation, and/or by cross-linking (e.g., oxidative cross-linking).

In some embodiments, methods of manufacturing compositions and/or articles as provided herein further comprise a step of embossing after application of a top coat material. In some embodiments, methods of manufacturing an article further comprises a step of embossing an article.

In some embodiments, methods of manufacturing an article further comprises a step of rounding edges; contouring edges, or convexing edges. Various edge designs and method of forming edges that may be used in the present disclosure are described in U.S. Pat. No. 7,550,192, entitled "Resilient Floor Tile," issued on Jun. 23, 2009, which is incorporated herein by reference in its entirety.

Articles and methods of manufacturing such articles as described herein are a stark departure from traditional articles and methods. Over the past decade, materials and methods for forming tiles have focused on layering materials and methods so that when assembled mismatched layers would balance to create an aesthetically pleasing tile that would remain flat, thereby avoiding potential tripping hazards.

Traditional tiles, classified for marketing purposes as Luxury Vinyl Tiles (LVT) typically consist of a layered composition. From the bottom up, the layered LVT composition includes: a base layer, a design or print layer, a clear coating, and a top coat. The LVT base layer or layers are typically composed of between about 10-40% PVC resin, binder; and fillers. The total gauge of the PVC base layer is typically between 120-155 mils for a product with a 160 mil total thickness. If more than one base layer is used, stress can cause the tile to curl upwards resulting in a tripping hazard. Traditional LVT attempts to compensate by balancing any stress created by the subsequent layers above the base layer by loading the bottom layer with the highest binder level. The higher binder layer is designed to shrink due to plasticizer migration balancing the tile and preventing upward curl. In an alternate construction, a high-shrinking back coat in applied to the bottom side of the base layer to eliminate curl. This coating is typically a thermoset coating that shrinks upon curing (e.g. UV coating).

The design material typically consists of a white film between 2-5 mils thick with a printed pattern. The film consists of PVC with 0 to 20 phr of plasticizer. In some cases the film is not printed and instead the design is reverse printed on a clear film that is above the white film. The print layer is typically laminated to the base layer with heat and pressure. The print layer film is often made by calendaring PVC resin into a thin sheet. This calendaring can put additional stress into the film such that when it is laminated with heat and pressure to the tile base the print film tends to return to its original size (smaller) and can cause the tile to curl upward.

The clear film and the top coat can also have stresses due to manufacture such as the drying or curing process can cause the coating to shrink resulting in upward curl of the tile.

Thus, the typical LVT construction consists of several layers laminated together designed to give a flat tile. The end-use performance of the LVT tile is to some degree dependent on how the layers interact together. For example, the tile's ability to resist falling objects such as cans, knives, spoons, etc. (impact resistance) depends on each layers' ability to absorb the impact. A soft layer laminated on top of a very hard layer can be easily pierced as the hard layer acts as an "anvil" with respect to the softer layer. Conversely a hard layer laminated on top of a softer layer can "cushion" the impact on the hard layer reducing the damage. Additionally the adhesion between layers can have an effect on the impact and abrasion resistance such that poor interlayer adhesion can reduce the tile's ability to resist abrasion as the layers can be more easily removed.

EXEMPLIFICATION

Example 1

The present example describes preparation of an article in accordance with the present disclosure.

A base material was comprised of an EVA copolymer (Evatane 28-40 from Arkema), a tackifier (LX-1200 from Neville Chemical), and dolomite filler (5025 from Specialty Minerals) in the formula shown in below Table 1.

TABLE 1

| Base Material Composition | |
|---|---|
| Component | Weight Fraction |
| Evatane 28-40 | 0.1111 |
| LX-1200 | 0.0278 |
| 5025 Dolomite | 0.8611 |

Components were melt blended in a Banbury mixer at 250-300° F. and then calendared by a two roll calendar into a web. The web was then cooled and tiles were punched out of the web. The base material gauge was about 154 mil.

The tiles were then directly printed with a Durst model ink jet printer using a UV cured or curable ink set (Durst Ridged Ink Set manufactured for Durst by Sun Chemical UK). The printed bases were then coated with a clear protective material (HotCoating 717.5 from Kleiberit) at an application weight of 80 g/m$^2$. HotCoating 717.5 is a moisture-cured urethane. A specialized roll coater was used for the coating application process.

A top coat material (HotCoating 659 from Kleiberit) was then applied with a roll coater at 10 g/m² and UV cured. The gloss of the top coat material was 7-10% gloss.

The edges of the tile were rounded with a die mold at around 130° F.

The tile was mechanically embossed at around 130° F.

FIG. 1 shows a cross-sectional view of an article as described here and in accordance with the present disclosure. An article 100 is a composite, laminated structure that comprises a base material 110, a design material 120 applied on top of a base material, and a protective material 130 applied on top of a design material 120.

While the base material 110 is shown in FIG. 1 as having a significantly greater thickness than the other materials of the article 100, it should be appreciated that a base material thickness may be any desired thickness. The relative dimensions shown in FIG. 1 are not intended to be limiting. Preferably, however, the thickness of the base material 110 is such that it provides most of the structural rigidity to an article. More preferably, a thickness of a base material 110 is approximately 50-200 mils. A preferred thickness for an entire surface covering article 100 is approximately 4 mm.

Example 2

The present example compares end-use performance for tile manufactured using traditional materials and method with articles in accordance with the present disclosure.

End use performance of articles produced as described in Example 1 are provided here. Articles from Example 1 were evaluated for abrasion (Taber) resistance. Articles as described from Example 1 were compared for abrasion (Taber) resistance against commercial LVT the compositions where a design material is printed on a white film. Additionally, articles such as those described from Example 1 were compared for abrasion (Taber) resistance with samples directly print as described in Example 1; however, the directly printed design material was applied to a traditional LVT base material comprised of 17% PVC binder with the balance being dolomite and not an EVA base material from Example 1 or an EVA-like material as described herein.

The Taber abrasion test abraded a sample with a carborundum wheel (H22) for a given number of cycles or revolutions until the wheel abraded through to the design material. A higher number of cycles indicates better abrasion resistance. Data shown in Table 2 indicates that the combination of materials in Example 1 provides a uniquely high abrasion resistance as measured by Taber abrasion. Since the same design material was applied to both the traditional LVT base material and the EVA base material, the high abrasion resistance for the design material printed atop the EVA base material is unique and attributed to the synergy between the EVA base material and the design material.

Moduli of an EVA and a PVC base were measured using a Sintech Tensile Tester by determining the stress vs. strain curves. The modulus based on two points is inversely related to the Taber wear as shown in below Table 2.

TABLE 2

Taber Abrasion and Young's Modulus for Different Constructions

| Tile | Construction | Taber Cycles | Modulus (lbs./in.) |
|---|---|---|---|
| Example 1 | See Example 1 | 2500-4500 | 529 |
| PVC base | Direct print to standard LVT base | 250 | 2323 |
| Commercial Tile 1 | Single base with films | 250-400 | |
| Commercial Tile 2 | Single base with films | 850-1200 | |

TABLE 2-continued

Taber Abrasion and Young's Modulus for Different Constructions

| Tile | Construction | Taber Cycles | Modulus (lbs./in.) |
|---|---|---|---|
| Commercial Tile 3 | Double base layers with films | 1000 | |

As is shown by Table 2, moduli of an EVA base material were measured as more than five times lower. While not intending to be bound to a theory, Young's modulus for an article provides an indication that the unique abrasion resistance as described in the present disclosure.

Example 3

The present example compares end-use performance for tile manufactured using traditional materials and method with articles in accordance with the present disclosure.

Figure 2:
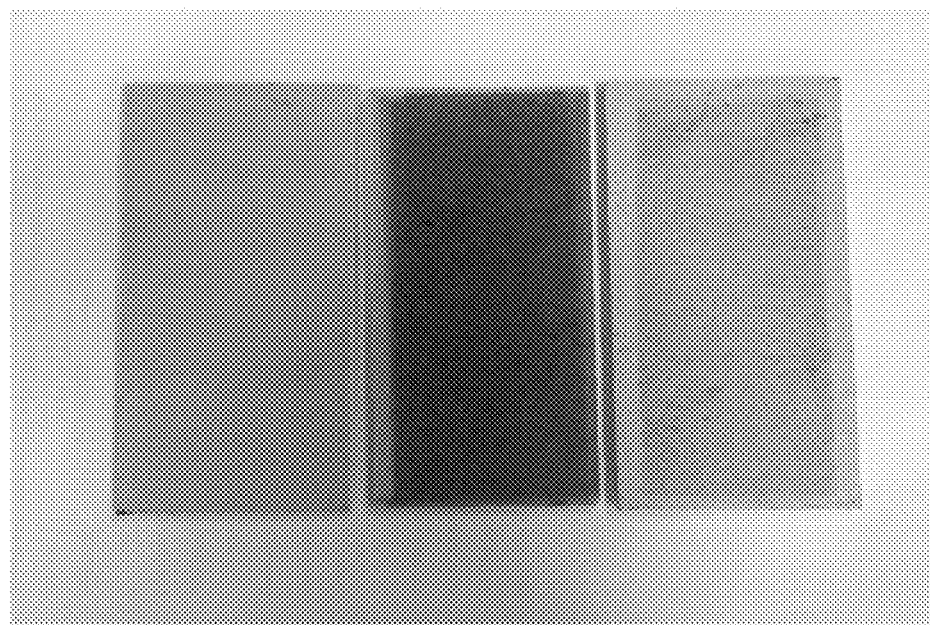
FIG. 2 shows tile exposed to Xenon Arc Exposure for a period.

A directly printed base material composition comprised of an EVA copolymer (Evatane 28-40 from Arkema), a tackifier (Nevtac 201 from Neville Chemical), and dolomite filler (5025 from Specialty Minerals) and formed in accordance with a process as described in Example 1 showed enhanced light stability when compared with traditional PVC base layers. Base materials comprising EVA were shown inherently stable during light exposure without expensive light stabilizing chemicals. Light stability was determined by exposing the tile base composition of Example 1, the PVC base composition described in Example 1, and the commercial tile base described in the description of LVT tile bases to UV light from a Xenon arc lamp in an Altlas Weather-Ometer CI-65 unit for 400 hours. The change in color (Delta E) was measured by a DataColor International ChromaSensor CS-5 unit and the results are shown in below Table 3. FIG. 2 show UV irradiated samples. FIG. 2a is an article as described in Example 1, FIG. 2b is a directly printed PVC base layer, and FIG. 2c is a traditional commercial LVT tile base layer.

TABLE 3

Delta E for Different Constructions

| Tile Base | Delta E (color change) |
|---|---|
| Example 1 | 4.68 |
| PVC base | 26.76 |
| Commercial Tile 2 base | 16.32 |

Example 4

The present example compares end-use performance for tile manufactured using traditional materials and method with articles in accordance with the present disclosure.

End use performance of articles produced as described in Example 1 are provided. Articles were evaluated for impact resistance. To evaluate the impact properties of provided articles, in this case resilient floor tiles, objects were dropped on the tiles from a fixed height and damage to the tile was visually evaluated. An impact resistance test, specifically a can drop test was performed. The can drop test is a standard measure used throughout the floor covering industry. The test consists of adhering a single tile to a plywood substrate using a recommended adhesive for a tile. For provided articles, resilient tiles, an acrylic latex was used. In this case, Congoleum's DS-100 adhesive was used to adhere the tile to the plywood substrate. For a typical ceramic or porcelain tile a standard mortar was used. A 54 oz metal can was dropped on to the tile from a height of six feet. The drop was performed in accordance with Congoleum Internal Method Z-84-2007. The can was dropped at an angle such that the lip of the can impacted the tile surface first. The tile was rotated 90 degrees after each drop and a total of four drops were done. The damage to the tile was visually evaluated.

The can drop test was done on six flooring materials. The qualitative visual assessment is in Table 4.

TABLE 4

Impact Resistance for Different Constructions

| Flooring Type | Can Drop Test Impact Result |
|---|---|
| PVC base construction (as described in Example 2) | Deep visible groove (FIG. 3) |
| Commercial ceramic tile | Shattered (FIG. 4) |
| Commercial LVT | Visible cracking (FIG. 5) |
| Provided Article (from Example 1) | Very shallow visible groove (FIG. 6) |

Figure 3:
FIG. 3 shows an image of a printed tile having a PVC base after a can drop test was performed.
Figure 4:
FIG. 4 shows an image of a commercial ceramic tile after a can drop test was performed.
Figure 5:
FIG. 5 shows an image of a commercial luxury vinyl tile after a can drop test was performed.
Figure 6:
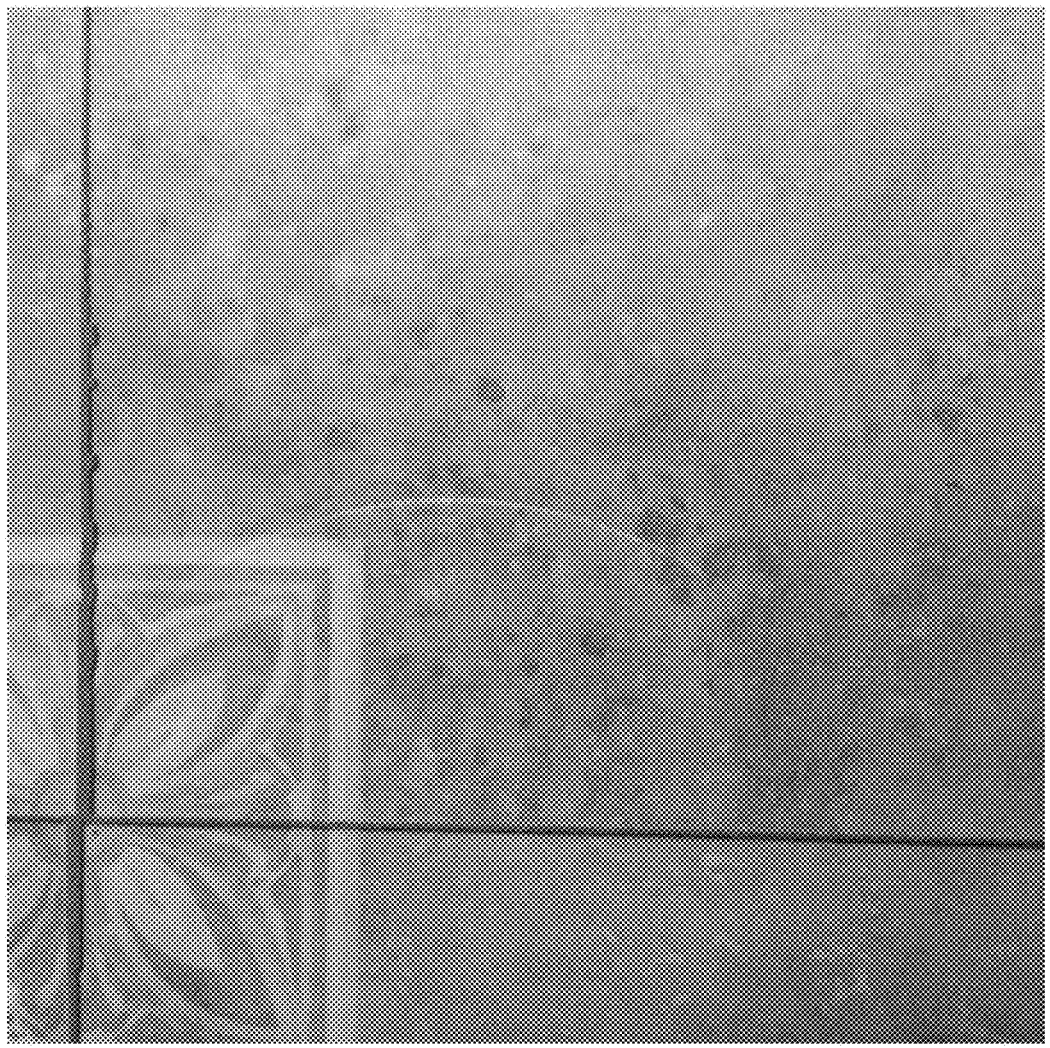
FIG. 6 shows an image of a resilient printed tile according to one embodiment of the present disclosure after a can drop test was performed.

FIG. 3 shows a test of an LVT with a PVC base construction, comprised of 17% PVC binder with the balance being dolomite and not an EVA base material from Example 1 or an EVA-like material as described herein. The traditional LVT base material was directly printed as described in Example 1. The result of the can drop showed a deep crescent shape groove in the surface of the tile. FIG. 4 shows a test of a commercial ceramic tile. The result of the can drop showed significant cracking to the tile. FIG. 5 shows a test of a commercial LVT. The result of the can drop showed visible cracking to the tile. FIG. 6 shows a test of a provided article made in accordance with Example 1. The result of the can drop showed a shallow groove.

Clearly, the visual assessment shows that the novel article of Example 1 has much less visible damage than the other types of commercial flooring. This data also shows that applying the coating layers described in Example 1 to a standard PVC base as shown in FIG. 3 do not provide visually comparable impact resistance to the falling can as is shown by the resistant tile of the present invention.

Example 5

The present example compares end-use performance for tile manufactured using traditional materials and method with articles in accordance with the present disclosure.

End use performance of articles produced as described in Example 1 are provided. Articles were evaluated for resistance to alkaline environments. Alkaline environments are often encountered in flooring environments when floor tiles are directly installed on below-grade concrete or "wet" new concrete. The alkalinity can pass through the back of the flooring and cause layers to delaminate and in some cases fade the design layer. As this is unacceptable, a test has been developed to mimic the alkaline environment. The tests consists of placing a concrete block in a tray with a 5% potassium hydroxide solution so that about half of the concrete block's height is above the level of the solution. A tile is then placed face up on the concrete block and monitored visually for four weeks. Ideally no visual change or delamination of layers will occur during the test.

To evaluate resistance to alkaline environments tiles were placed on the block for four weeks. No visible changes or delamination occurred after four weeks on the concrete block.

TABLE 5

Impact Resistance for Different Constructions

| Layer | Gauge/weight (mil or g/m2) | Part number | Manufacturer |
|---|---|---|---|
| EVA base | 154 mil | Composition of Example 3 | Congoleum |
| White pad coat | 45 g/m2 | HotCoating 582 | Kleiberit |
| Clear primer | 10 g/m2 | N/A | Barberan |
| UV ink | N/A | N/A | Barberan |
| Clear layer | 80 g/m2 | HotCoating 495 | Kleiberit |
| UV top coat | 12 g/m2 | 659.1.03 | Kleiberit |

OTHER EMBODIMENTS AND EQUIVALENTS

While the present disclosures have been described in conjunction with various embodiments, and examples, it is not intended that they be limited to such embodiments, or examples. On the contrary, the disclosures encompass various alternatives, modifications, and equivalents, as will be appreciated by those of skill in the art. Accordingly, the descriptions, methods and diagrams of should not be read as limited to the described order of elements unless stated to that effect.

Although this disclosure has described and illustrated certain embodiments, it is to be understood that the disclosure is not restricted to those particular embodiments. Rather, the disclosure includes all embodiments, that are functional and/or equivalents of the specific embodiments, and features that have been described and illustrated. Moreover, the features of the particular examples and embodiments, may be used in any combination. The present disclosure therefore includes variations from the various examples and embodiments, described herein, as will be apparent to one of skill in the art.

What is claimed is:

1. An article, comprising:
    a base material;
        wherein the base material is or comprises ethylene-vinyl acetate (EVA);
        wherein the EVA is about 5% to about 30% by weight of the base material; and
    a design material,
        wherein the design material is directly applied on the base material; and
    a protective material.

2. The article of claim 1, wherein the design material comprises an ink.

3. The article of claim 2, wherein the ink is UV cured or curable.

4. The article of claim 1, wherein the protective material is or comprises a moisture cured polyurethane hot melt coating, and wherein the protective material is disposed of on top of the design material.

5. The article of claim 1, wherein the base material further comprises an aesthetic background layer, which layer forms a background against which the design material is viewed.

6. The article of claim 5, wherein the base material further comprises a UV cured or curable primer disposed of on top of the aesthetic background layer.

7. The article of claim 5, wherein the aesthetic background layer is or comprises a moisture cured polyurethane hot melt coating.

8. A method of manufacturing an article, comprising steps of:
blending ethylene-vinyl acetate (EVA), a tackifier, and a filler at an elevated temperature to form a base material wherein the EVA is about 5% and about 30% by weight of the base material;
calendaring the base material onto a web;
directly applying at least one design material on the base material; and
applying at least one protective material to the design material.

9. The method of claim 8, further comprising a step of applying a moisture cured polyurethane hot melt coating onto the at least one design material on the base material.

10. The method of claim 9, further comprising a step of applying a top coat material on the moisture cured polyurethane hot melt coating.

11. The method of claim 8, the step of forming base material further comprises applying an aesthetic background layer on top of the base material, which layer forms a background against which the design material is viewed.

12. The method of claim 11, wherein the aesthetic background layer is a moisture cured polyurethane hot melt coating.

13. The method of claim 12, wherein the applying step comprises heated roll coating.

14. The method of claim 13, wherein the hot melt coating does not break, cleave, crack, or crumble when it is embossed or its edges are rounded, beveled, or depressed.

15. The method of claim 14, prior to the step of directly applying the at least one design material further comprising a step of finishing a top surface of the base material.

16. The method of claim 15, wherein the step of finishing comprises sanding, corona treating, and/or flame treating.

17. The method of claim 16, wherein the step of sanding comprises sanding with a surface having a grit of about 50 to about 500.

18. The method of claim 8, further comprising steps of:
finishing a top surface of the base material prior to the step of applying the at least one design material on the base material, wherein the finishing step consists of a member selected from the group consisting of sanding with a sanding surface having a grit of about 50 to about 500, corona treating, and flame treating;
heated roll coating an aesthetic background layer on top of the base material, so that the aesthetic background layer forms a background against which the design material is viewed,
wherein the aesthetic background layer is a moisture cured polyurethane hot melt coating;
applying a moisture cured polyurethane hot melt coating onto the at least one design material on the base material; and
applying a top coat material on the moisture cured polyurethane hot melt coating.

19. An article, comprising:
a base material;
wherein the base material is or comprises a polymer and/or a polymer mixture,
wherein the polymer and/or polymer mixture is substantially free of PVC resin,
wherein the polymer and/or polymer mixture characterized by a melt flow index as measured by ASTM D1238 in a range including: about 20 g/10 min to about 60 g/10 min, and
wherein the polymer and/or a polymer mixture comprises about 5% to about 30% by weight of the base material;
a design material,
wherein the design material is directly applied on the base material; and
a protective material.

20. The article of claim 19, wherein the polymer and/or a polymer mixture is or comprises a polyolefin copolymer or thermoplastic polyolefin.

21. The article of claim 19, further comprising an aesthetic background layer atop the base material, which layer forms a background against which the design material is viewed, and
wherein the design material comprises a primer, and a UV curable ink.

22. The article of claim 19, wherein the protective material comprises a moisture cured polyurethane hot melt coating and a UV cured or curable top coat material disposed on the moisture cured polyurethane hot melt coating.

23. An article, comprising:
a base material including an aesthetic background layer on a surface thereof, the base material comprising ethylene-vinyl acetate (EVA), a tackifier, and a filler, wherein the EVA comprises 5-20% of the base material;
a design material directly applied on a surface the aesthetic background layer,
wherein the design material comprises a primer and a UV curable ink;
wherein the aesthetic background layer forms a background against which the design material is viewed; and
a protective material adhered to the UV curable ink.

24. The article of claim 23, wherein the article is characterized by at least one of a Taber abrasion value greater than 2000 cycles, a tensile modulus of less than 1000 lbs./in, or its base material has a Delta E of less than 5 following Xenon arc exposure for at least 400 hours.

25. The article of claim 23, wherein the design material comprises a photo-realistic image of a desired aesthetic.

26. The article of claim 23, wherein a protective material is or comprises a moisture cured polyurethane hot melt coating.

27. The article of claim 26, wherein the protective material further comprises a UV cured or curable top coat material disposed on the moisture cured polyurethane hot melt coating.

28. The article of claim 1, wherein the EVA is about 1% to about 20% by weight of the base material.

29. The article of claim 1, wherein the EVA is less than about 15% by weight of the base material.

30. The article of claim 1,
wherein the base material includes an aesthetic background layer on a surface thereof, which layer forms a background against which the design material is viewed,
wherein the design material comprises a UV curable ink and a UV cured or curable primer disposed of on top of it, and
wherein the protective material is or comprises a moisture cured polyurethane hot melt coating adhered to the UV curable ink and a UV cured or curable top coat material disposed on the moisture cured polyurethane hot melt coating.

31. The article of claim 28, wherein the article is characterized by at least one of a Taber abrasion value greater than 2000 cycles, a tensile modulus of less than 1000 lbs./in, or its base material has a Delta E of less than 5 following Xenon arc exposure for at least 400 hours.

32. The article of claim 1, wherein the design material comprises a photo-realistic image of a desired aesthetic.

33. The article of claim 1, wherein the base material is designed and engineered to be punched from a calendared web having a single thickness.

34. The article of claim 5, wherein the aesthetic background layer is a white pad coating.

35. The article of claim 5, wherein the aesthetic background layer is or comprises a moisture cured polyurethane hot melt coating.

* * * * *